United States Patent [19]
Kim et al.

[11] Patent Number: 5,703,651
[45] Date of Patent: Dec. 30, 1997

[54] MOTION PICTURE EXPERT GROUP (MPEG) VIDEO CODER/DECODER APPARATUS

[75] Inventors: Hyung Suk Kim; Kwang Young Shin, both of Seoul, Rep. of Korea

[73] Assignee: LG Electronics, Inc., Seoul, Rep. of Korea

[21] Appl. No.: 577,226

[22] Filed: Dec. 22, 1995

[30] Foreign Application Priority Data

Dec. 23, 1994 [KR] Rep. of Korea ................ 36436/1994

[51] Int. Cl.$^6$ ................................................ H04N 7/18
[52] U.S. Cl. ..................... 348/416; 348/416; 348/415; 348/404; 348/699
[58] Field of Search ................ 358/335; 348/416, 348/415, 419, 423, 421, 405, 404, 699, 715, 716

[56] References Cited

U.S. PATENT DOCUMENTS

| | | | |
|---|---|---|---|
| 5,289,577 | 2/1994 | Gonzales et al. | 395/163 |
| 5,450,599 | 9/1995 | Horvath et al. | 395/800 |
| 5,491,515 | 2/1996 | Suzuki et al. | 348/401 |
| 5,510,842 | 4/1996 | Phillips et al. | 348/426 |
| 5,526,199 | 6/1996 | Seki et al. | 360/48 |
| 5,537,155 | 7/1996 | O'Connell et al. | 348/699 |
| 5,543,847 | 8/1996 | Kato | 348/415 |
| 5,550,643 | 8/1996 | Azadegan | 358/335 |
| 5,563,593 | 10/1996 | Puri | 341/67 |
| 5,563,961 | 10/1996 | Rynderman et al. | 382/239 |

*Primary Examiner*—Tommy P. Chin
*Assistant Examiner*—Anand Rao
*Attorney, Agent, or Firm*—John P. White

[57] ABSTRACT

An MPEG video CODEC includes a variable length decoder to a video coder with respect to an MPEG-2 profile. The MPEG video CODEC further includes a controller which controls both a signal sequence and a signal input/output function when a function of the MPEG video CODEC is converted to a decoding-mode and a coding-mode. Accordingly, the MPEG video coder and MPEG video decoder can be embodied as a single system. The MPEG video CODEC comprises a coding/decoding mode generator for detecting whether a mode signal inputted from an input terminal is a coding-mode, or a decoding-mode, and generating a corresponding mode control signal; a coder/decoder selector for selectively converting a routine of a coded bit stream, according to a corresponding mode control signal from the coding/decoding mode generator; and a coder/decoder for selectively coding or decoding a bit stream selected by the coder/decoder selector, and then transmitting the bit stream to a storage element, or to a displayer.

10 Claims, 4 Drawing Sheets

MOTION PICTURE EXPERT GROUP (MPEG) VIDEO CODER/DECODER APPARATUS

BACKGROUND OF THE INVENTION

1. Field of the Invention

The present invention relates to a motion picture expert group (hereinafter referred to as an MPEG-2) video coder-decoder (hereinafter referred to as a CODEC), and more particularly, to an MPEG video CODEC for commonly using many of hardwares, by embodying both a video coder and a video decoder with respect to an MPEG-2 main profile as a single system.

2. Description of the Prior Art

Generally, an MPEG-2 established as an international standard in compressing or reconstructing a dynamic image, efficiently compresses an image information by using a correlation between time and space of an image.

Namely, the MPEG-2 not only removes a time-redundancy of an image data by using a motion-compensation, but also removes a spacial redundancy of the image data by using a discrete cosine transform (hereinafter referred to as a DCT). Accordingly, a dynamic image data is compressed.

Figure 1:
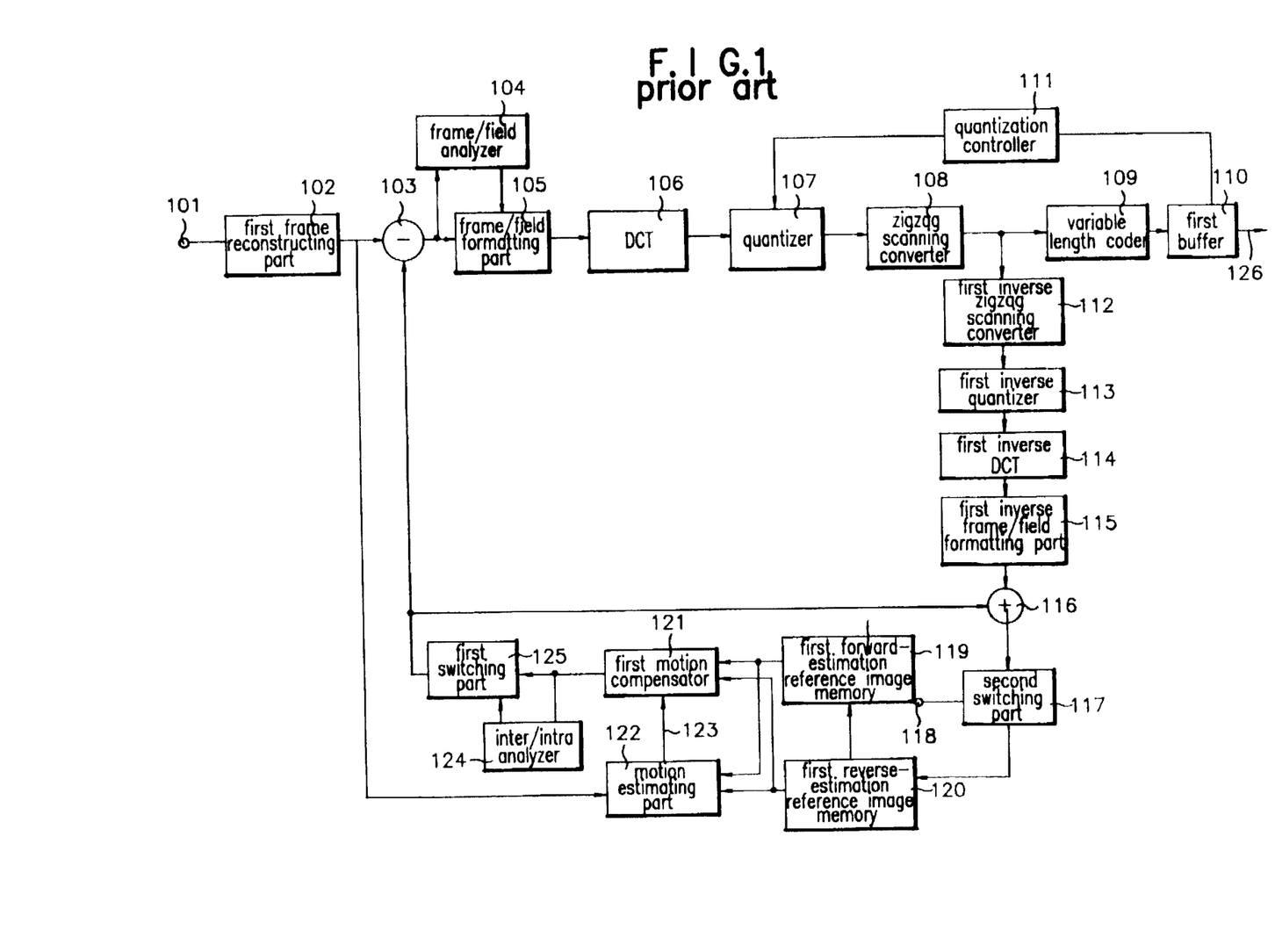
FIG. 1 shows a conventional MPEG-2 video coder.

The above-identified conventional MPEG-2 video coder is shown in FIG. 1.

Referring to FIG. 1, according to a motion-estimation method, a coding-type 118 of the prior MPEG-2 video coder is divided into three pictures, that is, I-frame picture, P-frame picture, and B-frame picture.

The I-frame picture is discrete cosine transformed through a discrete cosine transformer 106 without a motion-estimation, and is then coded. The P-frame picture only performs a forward-estimation. The B-frame picture performs a reverse-estimation, as well as the forward-estimation.

Accordingly, in case of the B-frame picture, an image inputted from a first input terminal 101 should be reconstructed in a first frame reconstructing part 102, according to a coded sequence.

A motion-estimating part 122 estimates a motion through the image outputted from the first frame reconstructing part 102, and then calculates a motion vector 123. A first motion compensator 121 compensates the motion by using the motion vector 123.

According to a motion-compensated image data through the above procedure, an inter/intra analyzer 124 determines whether a current macro block is processed at an inter mode for compensating the motion, or at an intra mode for performing DCT the motion without the motion-compensation, and then controls a first switching part 125 according to a corresponding mode.

A subtracter 103 outputs a difference image between an original image from the first input terminal 101 and a motion-compensated image.

The difference image determines a DCT-type in a frame/field analyzer 104, the frame/field formatting part 105 changes a data format according to the DCT-type determined through the frame/field analyzer 104.

An output signal of the frame/field formatting part 105 is discrete cosine transformed through a discrete cosine transformer 106 as a frequency component signal. The frequency component signal from the discrete cosine transformer 106 is quantized by a quantizer 107 as a quantization coefficient, and is then inputted to a zigzag (hereinafter referred to as ZZ) scanner 108.

The quantization coefficient from the quantizer 107 is detected as a pair of a zero-run and a level, according to the ZZ scanning sequence in the ZZ scanner 108. In this case, the quantizer 107 receives a feedback control signal according to a state of a first buffer 110.

That is, if a number of output bit streams are stored in the first buffer 10 because of many output bit streams, the quantization controller 111 raises a quantized scale, and then transmits the quantized scale to the quantizer 107, thereby reducing the bit quantity. On the contrary, if a small number of bit streams are stored in the first buffer 110, the quantized scale is lowered, thereby increasing the bit quantity.

In a variable length coder 109, the pair of a zero-run and a level through the ZZ scanner 108 is transformed as a bit row responsive to the MPEG-2 main profile together with additional informations, e.g., a motion vector 123, and is then outputted to an output terminal 126 as a constant bit rate after passing through the first buffer 110.

At this time, an output signal of the ZZ scanner 108 successively enters four decoding procedures, i.e., a first inverse ZZ scanner 112, a first inverse quantizer 113, a first inverse discrete cosine transformer 114, and a first inverse frame/field formatting part 115, and is then decoded. Then, since the decoded output signal is added to the motion-compensated image in a first adder 116, the output signal of the ZZ scanner 108 is reconstructed.

To use a reconstructed image as a reference image for both the motion estimating part 122 and the first motion compensator 121, the reconstructed image is stored in a first reverse-estimation reference image memory 120 after passing through a second switching part 117 when a coding-type of an image from a second input terminal 118 is the I-frame picture or the P-frame picture, and is then transferred from the first reverse-estimation reference image memory 120 to a first forward-estimation reference image memory 119 when the I-frame picture or the P-frame picture is coded again.

Figure 2:
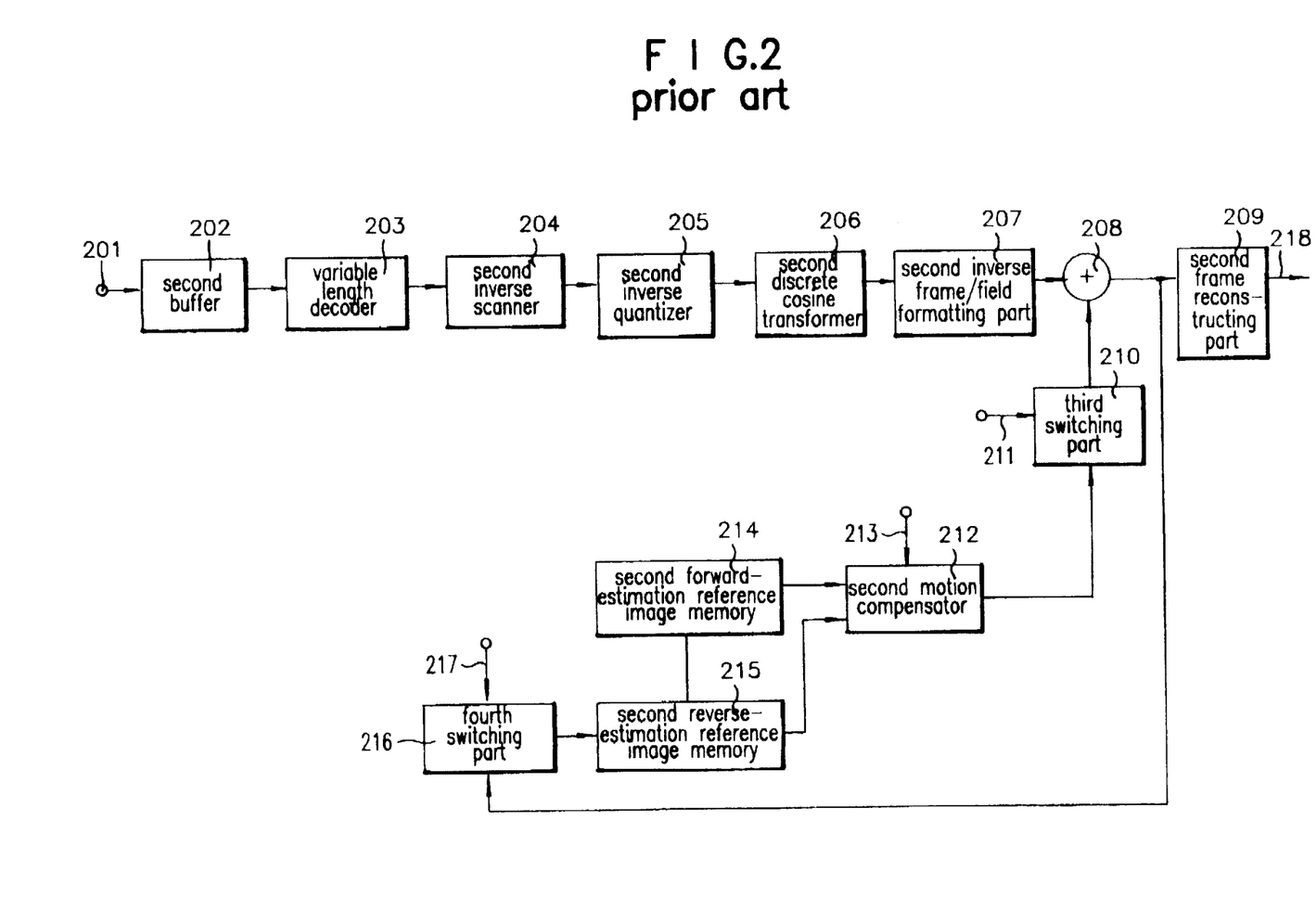
FIG. 2 shows a conventional MPEG-2 video decoder.

FIG. 2 shows a conventional MPEG-2 video decoder.

The MPEG-2 video decoder reconstructs an original image from a video bit row of the MPEG-2 coder shown in FIG. 1. Then, the MPEG-2 video decoder displays the reconstructed image on a monitor, or stores the reconstructed image in a storage element of a hardware.

Referring to FIG. 2, a bit stream from a third terminal 201 is temporally stored in a second buffer 202, and then is decoded as a DCT coefficient information and additional informations such as a motion vector, an inter/intra signal, and a coding-type, etc., in a variable length decoder 203.

In a second inverse scanner 204, the decoded DCT coefficient information is reconstructed as a previous value without a ZZ scanning. The reconstructed information, after passing through both a second inverse quantizer 205 and a second inverse frame/field formatting part 207, is reconstructed as an image in case of the I-frame picture (that is, intra-mode), and is reconstructed as a difference image in case of an P-frame picture and B-frame picture (that is, inter-mode).

The reconstructed difference image is added to a motion-compensated image in a second adder 208, is reconstructed according to a displaying sequence in a second frame reconstructing part 209, and is outputted to an output terminal 218.

To use the reconstructed image as a reference image for the second motion compensator 212, the reconstructed image is stored in a second reverse-estimation reference image memory 215 after passing through a fourth switching part 217 when a coding-type of an image from a sixth input terminal 217 is the I-frame picture, or the P-frame picture, and then is transferred from the second reverse-estimation reference image memory 215 to a second forward-estimation reference image memory 214 when the I-frame picture or the P-frame picture is coded again.

The second motion compensator 212 compensates a motion by using both a reference image which are stored in both the second forward-estimation reference image memory 214 and the second reverse-estimation reference image memory 215, and a motion vector which is calculated by the variable length decoder 203 and is inputted to a fifth input terminal 213.

According to an intra/inter information 211 generated in the variable length decoder 203, the motion-compensated image from the second motion compensator 212 passes through a third switching part 210 in case of the inter-mode, and is transferred to the second adder 208.

However, conventionally, although a number of hardwares in both a MPEG-2 coder and a MPEG-2 decoder may be commonly used when the MPEG-2 coder exists together with the MPEG-2 decoder, a coder and a decoder have been separately existed in a system. Accordingly, the number of hardwares has been increased, a weight and a size of products have been also increased.

SUMMARY OF THE INVENTION

An object of the present invention is to provide an MPEG video CODEC which includes a variable length decoder to a video coder with respect to an MPEG-2 profile, further includes a controller for controlling both a signal sequence and a signal input/output function when a function of the MPEG video CODEC is converted to a decoding-mode and a coding-mode. Accordingly, the MPEG video coder and MPEG video decoder can be embodied as a single system.

In order to achieve this object, an MPEG video CODEC includes:

a coding/decoding mode generator for detecting whether a mode signal inputted from an input terminal is a coding-mode, or a decoding-mode, and generating a mode control signal corresponding to a detected mode;

a coder/decoder selector for selectively converting a routine of a coded bit stream received by the mode control signal from the coding/decoding mode generator; and an MPEG video coder/decoder for coding or decoding the bit stream selected by the coder/decoder selector, and then transmitting the bit stream to a storage element, or to a displayer.

Another MPEG video CODEC includes:

an analog-to-digital converter for receiving an analog image signal pick up from more than one reproducer having an optical system, sampling the analog video signal, and generating a digital image signal with respect to an MPEG-2 main profile;

an MPEG system decoder for decoding a bit stream reproduced from a digital storage element as both an audio bit-row and a video bit-row;

an MPEG video coder/decoder for detecting a mode signal inputted from outside, reconstructing an original image signal from the video bit-row decoded by the MPEG system decoder in case of a reproducing mode, and transmitting coded digital image signals to the video-bit-row, after coding both the digital image signal achieved from the analog-to-digital converter and another digital image signal received corresponding to MPEG-2 main profile in case of a recording mode; and an MPEG system coder for coding both the video bit-row and the audio bit-row which are achieved from the MPEG video coder, and recording them into a digital storage element.

DETAILED DESCRIPTION OF THE PREFERRED EMBODIMENT

Figure 3:
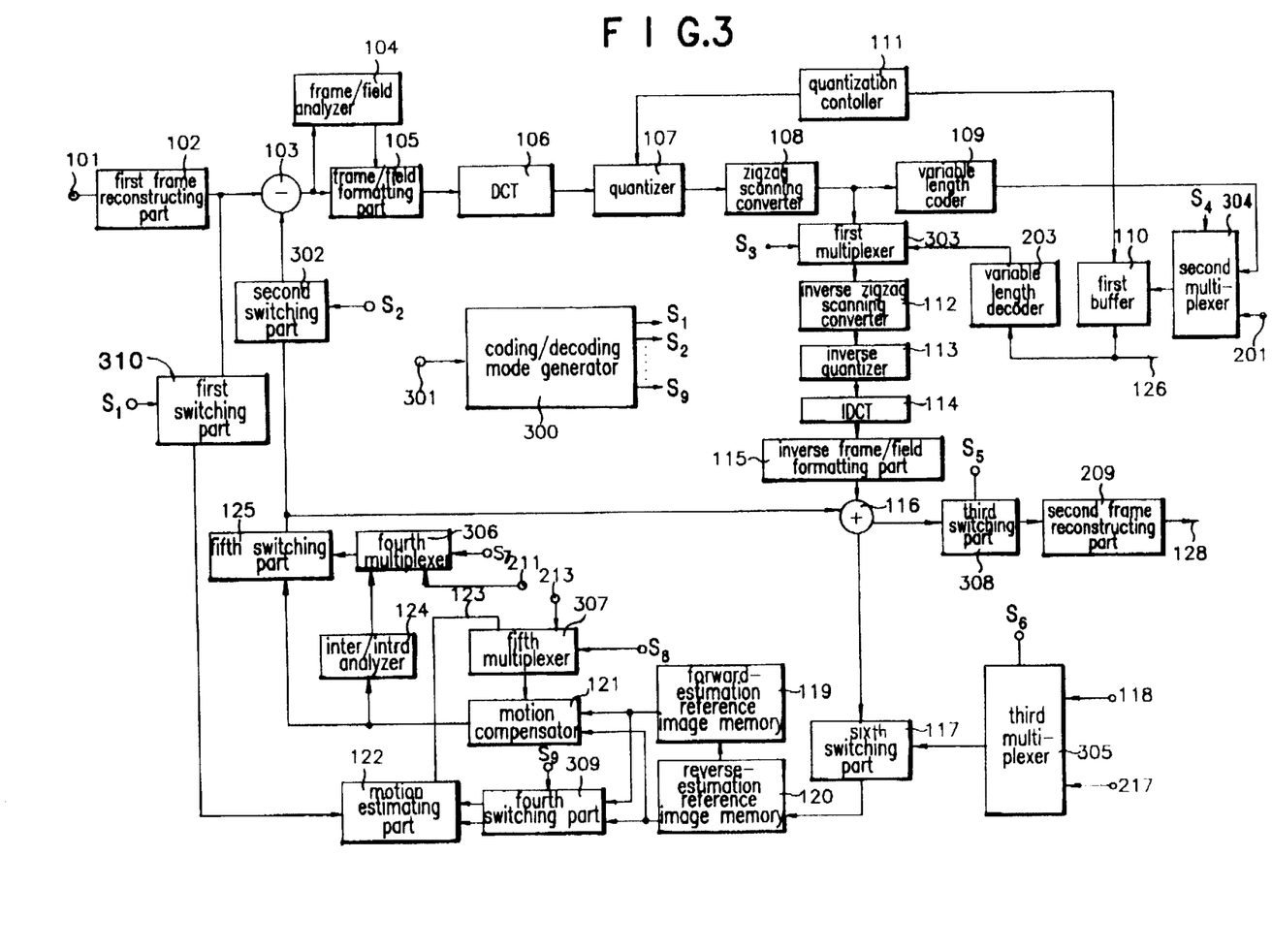
FIG. 3 shows an MPEG-2 video CODEC in accordance with a preferred embodiment of the present invention.

Referring to FIG. 3, the MPEG-2 video CODEC includes:

a coding/decoding mode generator 300 for detecting whether a mode signal inputted from an input terminal is a coding-mode, or a decoding-mode, and generating one among a first mode control signal S1 to a ninth mode control signal S9 according to a detected mode;

a coder/decoder selector for selectively converting a routine of an image bit stream received from a first input terminal 101, with respect to a corresponding mode control signal among the mode control signals S1 to S9 outputted from the coding/decoding mode generator; and an MPEG video coder/decoder for coding or decoding the image bit stream selected by the coder/decoder selector, and then transmitting the image bit stream to a storage element, or to a displayer.

The coder/decoder selector includes:

a second multiplexer 304 which not only selects a variable length coded bit stream from a variable length coder 109 by using a fourth mode control signal S4 generated from the coding/decoding mode generator 300 and then outputs the selected bit stream to a first output terminal 126 through a first buffer 110, but also selects a bit stream inputted through a second input terminal 201 and then provides the bit stream from the second input terminal 201 to the variable length decoder 203 through the first buffer 110;

a first multiplexer 303 which selects both a DCT coefficient information which is decoded by the variable length decoder 203, and a pair of run and level which is zigzag scanned by a ZZ scanner 108 by using a third mode control signal S3, and then provides both DCT coefficient information and the pair of run and level to an inverse ZZ scanner 112;

a third switching part 308 which outputs an image information in which a motion is compensated by an adder 116, to a second output terminal 218 through a second frame reconstructing part 209, according to a fifth mode control signal S5 generated from the coding/decoding mode generator 300;

a third multiplexer 305 which selects both a coding-type through a third input terminal 118 and a decoding-type through a fourth input terminal 217, and provides both the coding-type and the decoding-type to a sixth switching part 117, according to a sixth mode control signal S6 generated from the coding/decoding mode generator 300;

a fourth multiplexer 306 which selects an inter/intra signal achieved from an inter/intra analyzer 124, or another inter/intra signal which is reproduced by the variable length decoder 203 and then is inputted through a fifth input terminal 211, and finally controls a fifth switching part 12, according to a seventh mode control signal S7 generated from the coding/decoding mode generator 300;

a fifth multiplexer 307 which selects a motion vector 123 achieved from a motion estimating part 122, or a reconstructed motion vector inputted through a sixth input terminal 213, and then provides a selected motion vector to a motion compensator 121, according to an eighth mode control signal S8 generated from the coding/decoding mode generator 300;

a fourth switching part 309 which selects a reference image data of a forward-estimation reference image memory 119, or another reference image data of a reverse-estimation reference image memory 120, and then provides a selected reference image data to the motion estimating part 122, according to a ninth mode control signal S9 generated from the coding/decoding mode generator 300;

a second switching part 302 which is switched by a second mode control signal S2 generated from the coding/decoding mode generator 300, and then provides a motion-compensated image information inputted through the fifth switching part 125 to a subtractor 103; and a first switching part 310 which provides an input image information generated from a first frame reconstructing part 102, to the motion-estimation part 122, according to a first mode control signal S1 generated from the coding/decoding mode generator 300.

Some portions of FIG. 3, identical with portions of FIGS. 1 and 2, have the same reference numbers as shown in FIGS. 1 and 2.

When a first input terminal 101 inputs an image data to be transmitted and a seventh input terminal 301 inputs a mode signal (that is, coding-mode and decoding-mode) to be transmitted, a first frame reconstructing part 102 reconstructs the image data inputted through a first input terminal 101 according to a coded-sequence, and then the reconstructed image data is input to a subtracter 103. Also, the coding/decoding mode generator 300 determines whether a mode signal inputted through the seventh input terminal 301 is a decoding-mode, or a coding-mode, generates each of mode control signals S1 to S9 with respect to a corresponding mode, and controls both first to fifth multiplexers 303 to 307 and first to fourth switching parts 310, 302, 308, and 309 in a coder/decoder selector according to a corresponding mode.

The first switching part 310 in the coder/decoder selector is turned on when the first mode control signal S1 from the coding/decoding mode generator is a coding-mode, transmits an image information reconstructed through the first frame reconstructing part 102 to the motion estimating part 122 in which the motion is estimated.

And, the second switching part 302 is turned on when the second mode control signal S2 from the coding/decoding mode generator is a coding-mode, and then provides a motion-compensated image information inputted through a fifth switching part 125 to the subtracter 103.

Accordingly, the subtracter 103 calculates a difference between the input image information reconstructed through the first frame reconstructing part 102 and the motion-compensated image information inputted through the second switching part 125, and then provides the difference signal to both the frame/field analyzer 104 and the frame/field formatting part 105.

The frame/field analyzer 104 determines a DCT-type by using the difference signal, and then inputs the DCT-type to the frame/field formatting part 105.

According to the DCT-type determined by the frame/field analyzer 104, the frame/field formatting part 105 transforms the difference signal from the subtracter 103 with respect to a data format.

The image information outputted from the frame/field formatting part 105 is discrete cosine transformed by a discrete cosine transformer 106 as a frequency component signal, is quantized by a quantizer 107, and is then inputted to ZZ scanner 108.

The ZZ scanner 108 detects a pair of a zero-run and a level according to an inputting sequence of a quantization coefficient inputted from the quantizer 107, and provides the pair of a zero-run and a level to both a first multiplexer 303 in the coder/decoder selector and the variable length coder 109.

In the variable length coder 109, the pair of zero-run and level is transformed to a bit stream responsive to the MPEG-2 main profile, together with additional informations, e.g., a motion vector 123, and is then provided to a second multiplexer 304 of the coder/decoder selector 304.

At this time, if a fourth mode control signal S4 outputted from the coding/decoding mode generator 300 is a coding-mode, the second multiplexer 304 of the coder/decoder selector selects a bit row of a coded image information in the variable length coder 109, and then transmits the bit row as a constant bit stream through both a first buffer 110 and the first output terminal 126. On the contrary, if the fourth mode control signal S4 outputted from the coding/decoding mode generator 300 is a decoding-mode, the second multiplexer 304 selects a bit row of the image information inputted through an input terminal of a decoder, and then provides the bit row to the variable length decoder 203 through the first buffer 110.

At this time, the quantizer 107 receives a feedback control signal according to a state of a first buffer 110 in a coding-mode.

That is, if a number of bit rows are stored in the first buffer 110 because of many output bit rows of the variable length coder 109 of a coder, a quantization controller 111 raises a quantized scale, and then transmits the quantized scale to the quantizer 107, thereby reducing the bit quantity. On the contrary, if a small number of bit rows are stored in the first buffer 110, the quantized scale is lowered, thereby increasing the bit quantity.

Meanwhile, the variable length decoder 203, in a decoding-mode, decodes a bit stream from the first buffer 110 as a DCT coefficient information and additional informations such as a motion vector, inter/intra signal, and DCT-type. The DCT coefficient information is provided to a first multiplexer 303 of a coder/decoder selector 303, the motion vector is provided to the fourth input terminal 211, the inter/intra signal is provided to a fifth input terminal 213, and the DCT-type is provided to a sixth input terminal 217.

When the third mode control signal S3 from the coding/decoding mode generator 300 is a decoding-mode, the first multiplexer 303 of the coder/decoder selector selects a DCT coefficient information decoded by the variable length decoder 203, and then provides the decoded DCT coefficient information to the ZZ scanner 112. When the third mode control signal S3 from the coding/decoding mode generator 300 is a coding-mode, the first multiplexer 303 of the coder/decoder selector selects the pair of zero-run and level inputted through the ZZ scanner 108, and then provides it to the inverse ZZ scanner 112.

The pair of zero-run and level or the DCT coefficient information that are selected by the first multiplexer 303, is decoded through four elements, i.e., the ZZ scanner 112, an inverse quantizer 113, an inverse discrete cosine transformer (IDCT) 114, and an inverse frame/field formatting part 115, and is then provided to adder 116.

The adder 116 adds a decoded image signal inputted through the inverse frame/field formatting part 115 to the motion-compensated image signal inputted through the fifth switching part 125, and provides a reconstructed image signal to the sixth switching part 117, as well as the third switching part 308 of the coder/decoder selector 308.

At this time, the third switching part 308 is turned on when the fifth mode control signal S5 from the coding/decoding mode generator 300 is a decoding-mode, the image signal reconstructed by the adder 116 is outputted to the second output terminal 218 through the second frame reconstructing part 209. The second output terminal 218 is an output terminal of a decoder.

Although a hardware of the second frame reconstructing part 209 is identical with that of the first frame reconstructing part 102 used in a coding-mode, there is a difference between an operation of the second frame reconstructing part 209 and an operation of the first frame reconstructing part 102.

That is, in case of I-frame picture and P-frame picture, the second frame reconstructing part 209 used in a decoding-mode outputs a reconstructed image signal to the output terminal 128, when I-frame picture and P-frame picture after a coded bit row are reconstructed. The second frame reconstructing part 209 in a B-frame picture delays the reconstructed image signal by one frame, and outputs the reconstructed image signal to the output terminal 128

The first frame reconstructing part 102 used in a coding-mode delays the bit stream inputted through the first input terminal 101 which is a coder input terminal, as much as a B-frame picture used, and is then reconstructed according to the coded-sequence.

The sixth switching part 117 provides the output signal of the adder 116 to a reverse-estimation reference image memory 120, according to the sixth mode control signal S6 of the coder/encoder mode generator 300.

Namely, if the sixth mode control signal S6 is a decoding-mode, the third multiplexer 305 selects a reconstruction coded-type which is decoded in the variable length decoder 203 and is then inputted to the sixth input terminal 217, and provides the reconstructed coded-type to the sixth switching part 117. If the sixth mode control signal S6 is a coding-mode, the third multiplexer 305 selects a Coded-type which is coded in the variable length coder 109 and is then inputted to the third input terminal 118, and provides the selected coded-type to the sixth switching part 117.

Since the switching part 117 is turned on according to the coded-type or the reconstruction coded-type through the third multiplexer 305, I-frame picture or P-frame picture through the adder 116 is stored in the reverse-estimation reference image memory 120. In the coding-mode or the decoding mode, the I-frame picture or P-frame picture stored in the reverse-estimation reference image memory 120, is provided to a forward-estimation reference image memory 119, a fourth switching part 309, and a motion compensator 121.

The forward-estimation reference image memory 119 provides a forward-estimation reference image to both the motion compensator 121 and the fourth switching part.

The fourth switching part 309 is turned on when the ninth control signal S9 from the coding/decoding mode generator 300 is a coding-mode, and provides reference images of both the forward-estimation reference image memory 119 and the reverse-estimation reference image memory 120 to the motion estimating part 122.

The motion estimating part 122 estimates a motion of the image signal inputted through the first switching part 310 according to the reference image signals through the fourth switching part 309, calculates a motion vector 123, and then provides the motion vector 123 to the fifth multiplexer 307.

When an eighth mode control signal S8 from the coding/decoding mode generator 300 is a coding-mode, the fifth multiplexer 307 selects the motion vector 123 from the motion estimating part 122, and provides the motion vector 123 to the motion compensator 121. When an eighth mode control signal S8 is a decoding-mode, the fifth multiplexer 307 selects a reconstruction motion vector which is decoded in the variable length decoder 203 and is then received by the fifth input terminal 213, and provides the reconstruction motion vector to the motion compensator 121.

According to not only the motion vector 123 and the reconstruction motion vector that are achieved from the fifth multiplexer 307, but also reference images from image memories 119 and 120, the motion compensator 121 compensates a motion, and provides a compensated motion data to both the inter/intra analyzer 124 and the fifth switching part 125.

By the image data compensated by the motion compensator 121, an inter/intra analyzer 124 determines whether a current macro block is processed at an inter mode for compensating a motion, or an intra mode for performing DCT without the motion compensation, and then provides a determined mode to a fourth multiplexer 306.

When a seventh mode control signal S7 from the coding/decoding mode generator 300 is a coding-mode, the fourth multiplexer 306 transmits the inter/intra mode determined by the inter/intra analyzer 124 to the fifth switching part 125. When a seventh mode control signal S7 from the coding/decoding mode generator 300 is a decoding-mode, the fourth multiplexer 306 selects the inter/intra mode which is decoded in the variable length decoder 203 and is then received by the fourth input terminal 211, and provides the inter/intra mode signal to the fifth switching part 125.

The fifth switching part 125 is switched by the inter/intra mode from the fourth multiplexer 306, and provides a motion-compensated image signal through the motion compensator 121 to a subtracter 103 through the second switching part 302 in case of a coding-mode.

Synthetically, when the coding-mode is received by the seventh input terminal 301, the coding/decoding mode generator 300 generates mode control signals S1 to S9, some portions needed to a decoding-mode, e.g., the variable length decoder 203, the second frame reconstructing part 209, the reconstruction coded-type, and the inter/intra signal, are stopped.

On the contrary, when the decoding-mode is received by the seventh input terminal 301, some portions needed to a coding-mode, e.g., the first frame reconstructing part 102, the subtracter 103, the frame/field analyzer 104, the frame/field formatting part 105, the discrete cosine transformer 106, the inter/intra analyzer 124, and the motion estimating part 122, are stopped.

Figure 4:
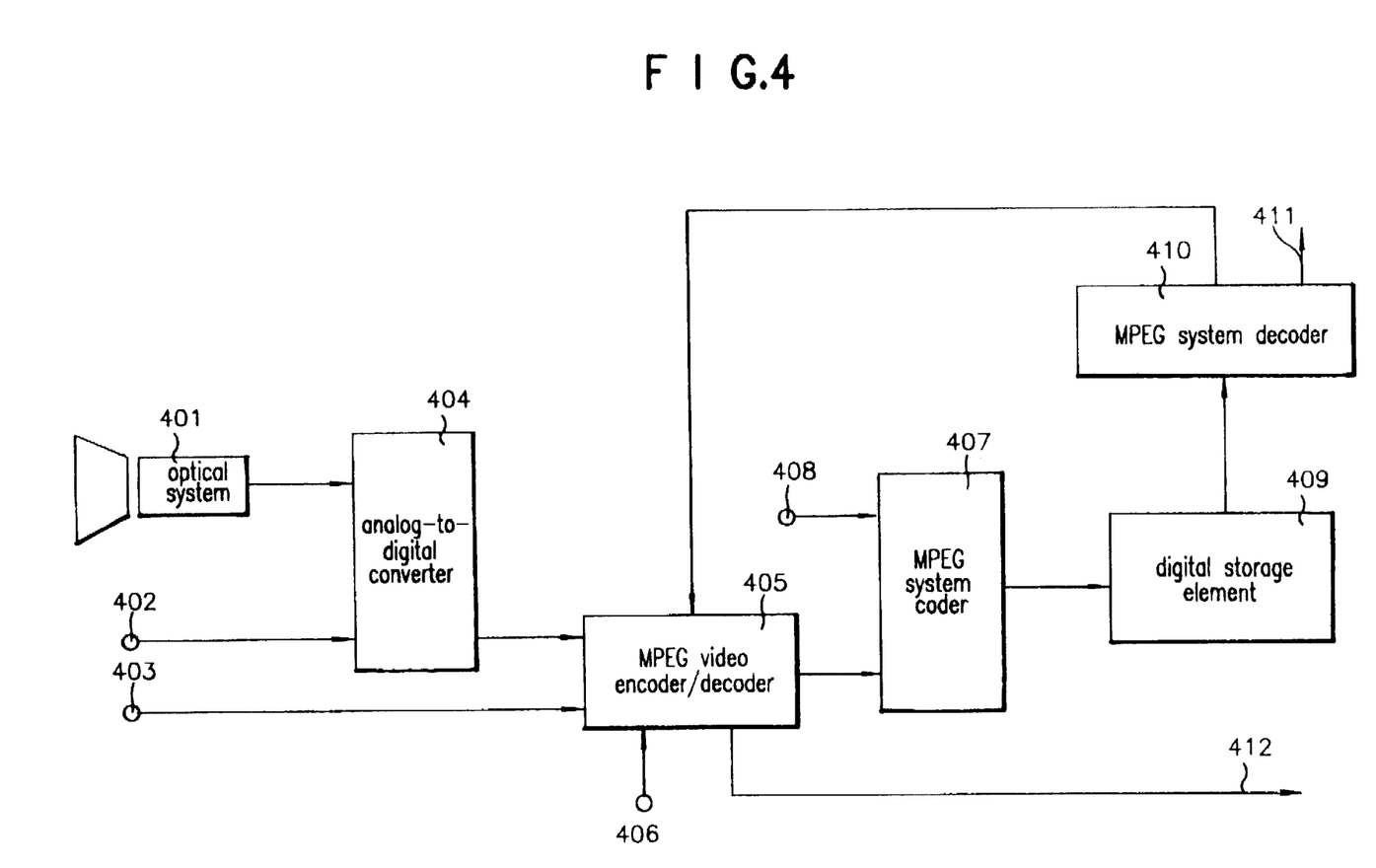
FIG. 4 shows an MPEG-2 video camcorder having the MPEG-2 video CODEC of FIG. 3.

FIG. 4 shows an MPEG-2 video camcorder having the MPEG-2 video CODEC of FIG. 3.

Referring to FIG. 4, an MPEG-2 video camcorder having the MPEG-2 video CODEC of FIG. 3 includes:

an optical system 401 for picking up an object;

an analog-to-digital converter 404 for sampling both an image signal pick up from the optical system 401 and another analog image signal inputted through a first input terminal 402, and generating a digital image signal with respect to an MPEG-2 main profile;

an MPEG system decoder 410 for decoding a bit row reproduced from a digital storage element 409 as an audio bit-row and a video bit-row, and outputting the audio bit row to the first output terminal 411;

an MPEG video coder/decoder for detecting a mode signal inputted from the fourth input terminal 406, reconstructing an original image signal from the video bit-row decoded by the MPEG system decoder 410 and outputting the reconstructed image signal to the second output terminal 412 in case of a decoding-mode equal to a reproducing mode, and transmitting coded digital image signals to the video bit row, after coding both the digital image signal achieved from the analog-to-digital converter 404 and another digital image signal received corresponding to MPEG-2 main profile in case of a coding-mode equal to a recording mode; and an MPEG system ocher 407 for coding both the video bit-row from the MPEG video coder 405 and the audio bit-row from a third input terminal 408, and recording both the video hit-row and the audio bit-row into a digital storage element 409.

Firstly, an image signal of an object which is pick up from the optical system 401, or analog image signal inputted from the first input terminal 402, is inputted to the analog-to-digital converter 404.

The analog-to-digital converter 404 samples another analog image signal which is inputted from the optical system 401 or the first input terminal 402, and inputs a digital image signal with respect to the MPEG-2 main profile to the MPEG-2 video coder/decoder 405.

A digital image signal bit row inputted from the second input terminal 403, corresponding to the MPEG-2 main profile, is directly inputted to the MPEG video coder/decoder 405 without passing through the analog-to-digital converter 404.

Also, a bit row stored in the digital storage element 409 is decoded through the MPEG system decoder 410 as both the audio bit row and the video bit row, the audio bit row is outputted to the first output terminal 411, and the video bit row is inputted to the video coder/decoder.

In this case, when a mode signal from the fourth input terminal 406 is a decoding-mode equal to a recording-mode for recording the image, the MPEG video coder/decoder 405 operates as a coder. Accordingly, a digital image signal from the analog-to-digital converter 404, or another digital image signal from the second input terminal 403 is coded, and the video bit row is provided to the MPEG system coder 407.

The MPEG system coder 407 codes both the video bit row decoded by the MPEG video coder/decoder 405 and the audio bit row from the third input terminal 408 to be applied to a system, and records both the video bit row and the audio bit row to the digital storage element 409.

If a mode signal from the fourth input terminal 406 is a decoding-mode equal to the reproducing mode for reproducing the image, the MPEG video coder/decoder 405 operates as a decoder, reconstructs the video bit row which is decoded by the MPEG system decoder 410 to be applied to a system as an original image signal, and outputs the reconstructed image signal to the second output terminal 412.

As described above, the MPEG video CODEC in accordance with a preferred embodiment of the present invention, embodies both a video coder and a video decoder with respect to the MPEG-2 main profile as a single system, so that both a coder and a decoder need not to be separately existed in a system, as well as the MPEG video CODEC commonly uses many of hardwares. Accordingly, In case a product including a decoder and a coder in addition to the MPEG-2 main profile video camcorder, the number of hardwares used in the product can be reduced, a weight and a size of the product can be also reduced.

What is claimed:

1. A motion picture expert group (MPEG) video coder-decoder (CODEC), comprising:

a coding/decoding mode generator for detecting whether a mode signal inputted from an input terminal is a coding-mode, or a decoding-mode, and generating one among first to ninth mode control signals according to a detected mode;

a coder/decoder selector for selectively converting a routine of a coded bit stream according to said first to ninth mode control signals which are generated from said coding/decoding mode generator; and an MPEG video coder/decoder for selectively coding or decoding an image bit stream selected by the coder/decoder selector, and then transmitting the image bit stream to a storage element, or to a displayer, wherein said coder/decoder selector comprises:

a second multiplexer which not only selects a variable length coded bit row from a variable length coder according to a fourth mode control signal generated from said coding/decoding mode generator and then outputs said variable length coded bit row to a first output terminal through a first buffer, but also selects a bit row to be decoded and then provides said bit row to a variable length decoder through said first buffer;

a first multiplexer which selects both a discrete cosine transform (DCT) coefficient information which is decoded by said variable length decoder, and a pair of run and level which is zigzag scanned by a zigzag (ZZ) scanner according to a third mode control signal, and then provides both said DCT coefficient information and said pair of run and level to an inverse ZZ scanner;

a third switching part which outputs an image information in which a motion is compensated by an adder, to an output terminal of a decoder through a second frame reconstructing part, according to a fifth mode control signal generated from said coding/decoding mode generator;

a third multiplexer which selects both a coding-type of said variable length coder and a decoding-type of said variable length decoder, and then transmits both said coding-type and said decoding-type to a sixth switching part, according to a sixth mode control signal generated from said coding/decoding mode generator;

a fourth multiplexer which selects an inter/intra signal achieved from an inter/intra analyzer according to a seventh mode control signal generated from said coding/decoding mode generator, or another inter/intra signal reproduced by said variable length decoder, and controls a fifth switching part;

a fifth multiplexer which selects a motion vector achieved from a motion estimating part, or another motion vector reconstructed by said variable length decoder, and then provides a selected motion vector to a motion compensator, according to an eighth mode control signal generated from said coding/decoding mode generator;

a fourth switching part which selects a reference image data of a forward-estimation reference image memory, or another reference image data of a reverse-estimation reference image memory, and then provides a selected reference image data to said motion estimating part, according to a ninth mode control signal generated from said coding/decoding mode generator;

a second switching part which is switched by a second mode control signal generated from said coding/decoding mode generator, and then provides a motion-compensated image information through said fifth switching part to a subtractor; and a first switching part which provides an input image information generated from a first frame reconstructing part to the motion-estimation part, according to a first mode control signal generated from said coding/decoding mode generator.

2. The MPEG video CODEC as defined in claim 1, wherein:

said first switching part operates when an output mode from said coding/decoding mode generator is a coding-mode, transmits an image information of said first frame reconstructing part to said motion estimating part.

3. The MPEG video CODEC as defined in claim 1, wherein:

said second switching part 302 operates when said second mode control signal from said coding/decoding mode generator is a coding-mode, and provides said motion-compensated image information to said subtracter.

4. The MPEG video CODEC as defined in claim 1, wherein:

said first multiplexer selects a decoded value from said variable length decoder when a mode generated from said coding/decoding mode generator is a decoding mode.

5. The MPEG video CODEC as defined in claim 1, wherein:

said second multiplexer provides an output bit row of said variable length coder to said first buffer when a mode generated from said coding/decoding mode generator is a coding mode, or selects an input bit row of a decoder and provides said input bit row to said first buffer when a mode generated from said coding/decoding mode generator is a decoding mode.

6. The MPEG video CODEC as defined in claim 1, wherein:

said third switching part operates when a mode generated from the coding/decoding mode generator is a decoding-mode, and outputs an image signal from said adder through said second frame reconstructing part as a reconstructed image signal.

7. The MPEG video CODEC as defined in claim 1, wherein:

said third multiplexer selects a coding-type when a mode from said coding/decoding mode generator is a coding-mode, selects a decoding-type when a mode from said coding/decoding mode generator is a decoding-mode, and controls said sixth switching part.

8. The MPEG video CODEC as defined in claim 1, wherein:

said fourth multiplexer selects said inter/intra mode from said inter/intra analyzer when a mode generated from said coding/decoding mode generator is a coding-mode, and selects a reconstructed inter/intra mode of said variable length decoder when a mode generated from said coding/decoding mode generator is a decoding-mode.

9. The MPEG video CODEC as defined in claim 1, wherein:

said fifth multiplexer selects a motion vector calculated by said motion estimating part when a mode generated from said coding/decoding mode generator is a coding-mode, selects a reconstructed motion vector of said variable length decoder when a mode generated from said coding/decoding mode generator is a decoding-mode, and then transmits a selected motion vector to said motion compensator.

10. The MPEG video CODEC as defined in claim 1, wherein:

said fourth switching part transmits said reference image data to said motion estimating part, when a mode generated from said coding/decoding mode generator is a coding-mode.

* * * * *